United States Patent [19]

Schmiegel

[11] Patent Number: 4,489,196

[45] Date of Patent: Dec. 18, 1984

[54] CURABLE FLUOROPOLYMER COMPOSITION

[75] Inventor: Walter W. Schmiegel, Wilmington, Del.

[73] Assignee: E. I. Du Pont de Nemours and Company, Wilmington, Del.

[21] Appl. No.: 488,629

[22] Filed: Apr. 26, 1983

[51] Int. Cl.³ ............................................. C08J 3/24
[52] U.S. Cl. ............................... 525/326.3; 525/340; 525/372; 525/373; 525/384
[58] Field of Search ................. 525/326.3, 372, 373, 525/384, 340

[56] References Cited

U.S. PATENT DOCUMENTS

| | | | |
|---|---|---|---|
| 3,876,654 | 4/1975 | Pattison | 525/326.3 |
| 3,894,118 | 7/1975 | Aronoff et al. | 525/281 |
| 3,997,705 | 12/1976 | Trautvetter et al. | 525/340 |
| 4,177,223 | 12/1979 | Arhart et al. | 525/326.3 |

*Primary Examiner*—Joseph L. Schofer
*Assistant Examiner*—Bernard Lipman

[57] ABSTRACT

A curable fluoropolymer composition containing a copolymer of vinylidene fluoride and hexafluoropropylene or the like, a vulcanization accelerator which is a quaternary ammonium compound or a quaternary phosphonium compound, a crosslinking agent such as a bisphenol, a divalent metal oxide or divalent metal hydroxide acid acceptor, and as a coaccelerator a polyol e.g. pentaerythritol or the like.

6 Claims, No Drawings

CURABLE FLUOROPOLYMER COMPOSITION

This invention relates to a fluoropolymer composition that may be cured to form fluoroelastomeric articles, and to the process of curing said composition to form such articles.

BACKGROUND

It is known in the art to produce fluoroelastomeric articles by curing fluoropolymer compositions. U.S. Pat. No. 3,876,654 to Pattison discloses such compositions, processes for producing such articles, and such articles.

The present invention is an improvement over the composition and process taught in the Pattison patent. It has now been found that a faster cure can be obtained by use of the composition of the invention, or if desired the composition can be cured at about the same rate as that taught in Pattison, but the resulting product will have improved compression set and reduced water swell.

The curable fluoropolymer composition taught by Pattison contains:

1. A copolymer of vinylidene fluoride and at least one other fluorinated monomer, [Example of such other monomers include hexafluoropropylene, and mixtures of hexafluoropropylene and tetrafluoroethylene],
2. A quaternary phosphonium compound which acts as a vulcanization accelerator,
3. A divalent metal oxide or hydroxide or mixtures of said oxides or hydroxides with salts of weak acids, and
4. A crosslinking agent.

It has now been found that the Pattison composition is improved by the addition of 0.2 to 4 parts by weight, based on 100 parts of the fluoropolymer of a polyol selected from the class consisting of pentaerythritol, dipentaerythritol, trimethylol propane, and 2,2-dimethyl-1,3-propanediol. The polyol acts to accelerate the rate of cure, or if desired the polyol may replace a portion of the quaternary phosphonium compound accelerator and in doing so yields a composition that cures at about the same rate but results in a cured product having improved resistance to compression set. Finally the use of the polyol allows for the use of less metal oxide or hydroxide, and such a composition when cured has improved resistance to steam or boiling water—that is, it does not swell as much as the composition containing more divalent metal oxide or hydroxide.

SUMMARY

The present invention is a composition that may be cured to form a fluoroelastomer. The composition comprises the following components: (A) a copolymer containing polymerized vinylidene fluoride units, and polymerized hexafluoropropylene units or instead of hexafluoropropylene, or 1-hydro or 2-hydropentafluoropropylene units. The copolymer may contain other polymerized fluorinated monomer units, such as tetrafluoroethylene units, chlorotrifluoroethylene units, bromotetrafluorobutene units, and the like. Processes for the preparation of such polymers are disclosed for example in the Pattison patent, U.S. Pat. No. 3,876,654 and in the Apotheker et. al., U.S. Pat. No. 4,214,069. (B) A quaternary phosphonium vulcanization accelerator or a quaternary ammonium vulcanization accelerator. Such phosphonium compounds have the formula:

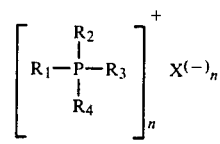

wherein P is phosphorous; $R_1$, $R_2$, $R_3$, and $R_4$ are selected individually from the group; $C_1-C_{20}$ alkyl, aryl, aralkyl, alkenyl, and the chlorine, fluorine, bromine, cyano, —OR, and —COOR substituted analogs thereof, R being selected from the group: $C_1-C_{20}$ alkyl, aryl, aralkyl, and alkenyl; and X is selected from the group: halide, sulfate, sulfite, carbonate, pentachlorothiophenolate, tetrafluoroborate, hexafluorosilicate, hexafluorophosphate, dimethyl phosphate, and $C_1-C_{20}$ alkyl-, aryl-, aralkyl-, and alkenyl-/-carboxylate and dicarboxylate: n is 1 or 2 and equal to the valence of the anion X, and are described and disclosed for this use in the Pattison patent. In the above formula X can also be $^-OAr$ or $^-OArOH$, where Ar is an aryl radical.

Such ammonium compounds include those disclosed in Kometani et al. U.S. Pat. No. 3,864,298 and Patel et al. U.S. Pat. No. 3,655,727 as well as cyclic amidinium salts of the formula

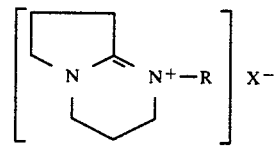

(C) A polyhydroxy aromatic crosslinking agent such as: di-, tri-, and tetrahydroxybenzenes, naphthalenes, and anthracenes, and bisphenols of the formula

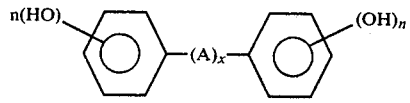

wherein A is a difunctional radical such as an aliphatic, cycloaliphatic, or aromatic radical of 1–13 carbon atoms, or a thio, oxy, carbonyl, sulfinyl, or sulfonyl radical; A is optionally substituted with at least one chlorine or fluorine atom; x is 0 or 1; n is 1 or 2; and any aromatic ring of the polyhydroxylic compound is optionally substituted with at least one atom of chlorine, fluorine, or bromine, a —CHO group, or a carboxyl or acyl radical (e.g., a —COR where r is OH or a $C_1-C_8$ alkyl, aryl, or cycloalkyl group). It will be understood from the above bisphenol formula that the —OH groups can be attached in any position (other than number one) in either ring. Blends of two or more such compounds can also be used. Such crosslinking agents and their use in curing fluoropolymers is disclosed in the Pattison patent. (D) A polyol coaccelerator selected from pentaerythritol, 2,2-dimethyl-1,3-propanediol, trimethylol propane, and dipentaerythritol. Pentaerythritol has the formula:

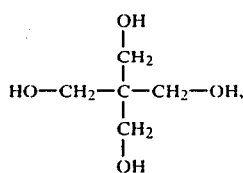

and in its pure form has a melting point of about 260.5° C., but is sold commercially in an impure form (for example by Hercules as PE-200) having a melting point of about 190° to 200° C. The impure form contains some dimer and higher aggregates, formed by the condensation of two or more molecules with formation of water. Either the pure pentaerythritol or the commercial form may be employed in this invention, and (E) a metal compound selected from the group consisting of divalent metal oxide and divalent metal hydroxide and mixtures of such oxides and hydroxides with metal salts of weak acids. The composition of the invention contains per 100 parts by weight of the copolymer, about 0.2 to 2.0 parts (preferably 0.3 to 1.5 parts) by weight of component (B) about 0.5 to 4 parts (preferably 1 to 3 parts) by weight of component (C), about 0.05 to 4 parts (preferably 0.1 to 2.0 parts) by weight of component (D) and about 0.5 to 30 parts (preferably about 1 to 6 parts calcium hydroxide and 1 to 9 parts magnesium oxide) by weight of component (E). Optionally the composition may also contain up to about 50 parts (preferably 15 to 35 parts) by weight of carbon black.

DETAILED DESCRIPTION

Among the most useful component A copolymers are: copolymers of vinylidene fluoride and hexafluoropropylene, chlorotrifluoroethylene, 1-hydropentafluoropropylene, or 2-hydropentafluoropropylene and copolymers of vinylidene fluoride, tetrafluoroethylene and hexafluoropropylene or 1-hydro or 2-hydropentafluoropropylene. "Copolymer" herein means the product of copolymerizing two or more monomers. Especially preferred are vinylidene fluoride/hexafluoropropylene copolymers in which the monomers are combined in a molar ratio of about 85:15 to 50:50. Component A can also be any other vinylidene fluoride copolymer fluoroelastomer which can be cured to useful products, for example copolymers of vinylidene fluoride and hexafluoropropylene or pentafluoropropylene with dichlorodifluoroethylene, chlorofluoroethylene, chlorotrifluoroethylene, bromotetrafluorobutene, (Polymers of this type are shown in Apotheker et al. U.S. Pat. No. 4,214,060), with fluorinated vinyl esters, with derivatives of perfluoroacrylic acid, and with fluorinated alkyl vinyl ethers; the latter can be illustrated by copolymers of vinylidene fluoride, hexafluoroethylene and a perfluoroalkyl perfluorovinyl ether.

Useful copolymers of vinylidene fluoride and 1,2,3,3,3-pentafluoropropylene are described in U.S. Pat. No. 3,331,823, and copolymers of these two components with tetrafluoroethylene are described in U.S. Pat. No. 3,335,106. The "other fluorinated monomer" of component A is preferably an ethylenically unsaturated monomer containing at least as many fluorine atoms as carbon atoms.

An essential ingredient of the composition is the component B accelerator.

Particularly preferred accelerators are benzyl triphenyl phosphonium chloride, -bromide, and -phenolates of aromatic dihydroxy compounds listed under component C, used either alone or blended with about 1-50 percent of another component B compound within the description set forth above, based on the total weight of accelerator. Other useful component B accelerators are illustrated as follows: methyl trioctyl phosphonium tetrafluoroborate, tetraphenyl phosphonium bromide and -chloride, benzyl trioctyl phosphonium bromide and -chloride, methyl trioctyl phosphonium acetate, methyl trioctyl phosphonium dimethyl phosphate, methyl trioctyl phosphonium chloride, methoxyethyoxyethyl trioctyl phosphonium chloride, tetraoctyl phosphonium bromide, butyl trioctyl phosphonium bromide, 1-carbethoxyethyl triphenyl phosphonium chloride, tetrabutyl phosphonium chloride, 2,4-dichlorobenzyl triphenyl phosphonium chloride, m-trifluoromethylbenzyl trioctyl phosphonium chloride, 2,2,3,3-tetrafluoropropyl trioctyl phosphonium chloride, 2,2,3,3,4,4,5,5-octafluoropentyl trioctyl phosphonium chloride, isobutyl triphenyl phosphonium bromide, 2-pentyl triphenyl phosphonium bromide, 4-methylbenzyl triphenyl phosphonium chloride, 4-chlorobenzyl triphenyl phosphonium chloride, diphenylmethyl triphenyl phosphonium chloride, m-trifluoromethylbenzyl triphenyl phosphonium chloride, 1-naphthylmethyl triphenyl phosphonium chloride, 2-cyanobenzyl triphenyl phosphonium bromide, 4-cyanobutyl triphenyl phosphonium bromide, α-carbethoxybenzyl triphenyl phosphonium bromide, carbethoxymethyl triphenyl phosphonium bromide, methoxymethyl triphenyl phosphonium chloride, allyloxymethyl triphenyl phosphonium chloride, allyl triphenyl phosphonium chloride, and tetrabutyl phosphonium bromide.

Component C of the curable composition can be selected from known polyhydroxylic aromatic compounds capable of functioning as a cross-linking agent for the elastomeric copolymer. For example, the component C cross-linking agent can be any one of the following: di-, tri-, and tetrahydroxybenzenes, naphthalenes, and anthracenes, and bisphenols of the formula

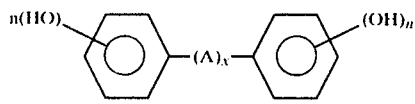

wherein A is a difunctional radical such as an aliphatic, cycloaliphatic, or aromatic radical of 1-13 carbon atoms, or a thio, oxy, carbonyl, sulfinyl, or sulfonyl radical; A is optionally substituted with at least one chlorine or fluorine atom; x is 0 or 1; n is 1 or 2; and any aromatic ring of the polyhydroxylic compound is optionally substituted with at least one atom of chorine, fluorine, or bromine, a —CHO group, or a carboxyl or acyl radical (e.g., a —COR where R is OH or a $C_1$-$C_8$ alkyl, aryl, or cycloalkyl group). It will be understood from the above bisphenol formula that the —OH groups can be attached in any position (other than number one) in either ring. Blends of two or more such compounds can also be used.

Referring to the bisphenol formula shown in the previous paragraph, when A is alkylene, it can be for example methylene, ethylene, chloroethylene, fluoroethylene, difluoroethylene, 1,3-propylene, 1,2-propylene, tetramethylene, chlorotetramethylene, fluorotetramethylene, trifluorotetramethylene, 2-methyl-1,3- propylene, 2-methyl-1,2-propylene, pentamethylene, pentachloropentamethylene, pentafluoropentamethylene, and hexamethylene. When A is alkylidene, it can be for example ethylidene, dichloroethylidene, difluoroethylidene, propylidene, isopropylidene, trifluoroisopropylidene, hexafluoroisopropylidene, butylidene, heptachlorobutylidene, heptafluorobutylidene, pentylidene, hexylidene, and 1,1-cyclohexylidene. When A is a cycloalkylene radical, it can be for example 1,4-cyclohexylene, 2-chloro-1,4-cyclohexylene, 2-fluoro-1,4-cyclohexylene, 1,3-cyclohexylene, cyclopentylene, chlorocyclopentylene, fluorocyclopentylene, and cycloheptylene. Furthermore, A can be an arylene radical such as m-phenylene, p-phenylene, 2-chloro-1,4-phenylene, 2-fluoro-1,4-phenylene, o-phenylene, methylphenylene, dimethylphenylene, trimethylphenylene, tetramethylphenylene, 1,4-naphthylene, 3-fluoro-1,4-naphthylene, 5-chloro-1,4-naphthylene, 1,5-naphthylene, and 2,6-naphthylene.

One highly preferred component C cross-linking agent is hexafluoroisopropylidene-bis(4-hydroxybenzene). A second preferred cross-linking agent is 4,4'-dihydroxydiphenyl sulfone. A third preferred cross-linking agent is 4,4'-dihydroxy-benzophenone. Another very useful cross-linking agent is 2,4-dihydroxybenzophenone, especially when the preferred composition described above is to be used in applications requiring a rapid rate of cure plus good compression set properties at a relatively low cross-linking agent content, but not requiring the lowest possible compression set values. Other useful component C cross-linking agents are illustrated by hydroquinone; by such dihydroxybenzenes as catechol, resorcinol, 2-methyl resorcinol, 5-methyl resorcinol, 2-methyl hydroquinone, 2,5-dimethyl hydroquinone, and 2-t-butyl hydroquinone; and by such compounds as 1,5-dihydroxynaphthalene and 9,10-dihydroxyanthracene.

The (D) component in the composition of the invention is a polyol, i.e. pentaerythritol, a known compound that is commercially available, or dipentaerythritol or 2,2-dimethyl-1,3-propanediol, or trimethylolpropane. The polyol acts as a coaccelerator in the vulcanization reaction.

The composition of the invention also contains component (E), a metal compound composed of a divalent metal oxide, such as magnesium oxide, zinc oxide, calcium oxide, or lead oxide, or a divalent metal hydroxide; or a mixture of the oxide and/or hydroxide with a metal salt of a weak acid, for example a mixture containing about 1-70 percent by weight of the metal salt. Among the useful metal salts of weak acids are barium-, sodium-, potassium-, lead-, and calcium-/-stearate, -benzoate, -carbonate, -oxalate, and -phosphite. The amount of the metal compound added generally is about 0.5-15 parts by weight per 100 parts of fluoroelastomer, about 2-10 parts being preferred. The metal compound concentration to some extent affects the rate of cure, and below the preferred range the cure rate may sometimes be unduly decreased. Above the preferred range, the elastic properties of a cured fluoroelastomer are gradually impaired and it is, therefore, advantageous not to use too large amounts of the metal compound.

The metal compound serves a dual purpose. It absorbs certain gaseous and acidic materials which are evolved during vulcanization and can chemically attack and weaken the fluoroelastomer. It also provides a long term aging stability. When using a metal oxide, it can be compounded with a fluoroelastomer stock either free or as a metal oxide complex or chelate with organic complexing agents and ligands, such as cyclic polyethers, amines, phosphines, ketones, alcohols, phenols, or carboxylic acids.

The initial cure of the curable composition is preferably carried out by heating the composition in a confining zone for about 30 seconds to 30 minutes at about 149° to 220° C. Conventional rubber curing presses, molds, extruders and the like provided with suitable heating and curing means can be used.

By using the present composition and process, one can overcome problems regarding the loss of resistance to high temperature compression set when high levels of phosphonium or ammonium salt accelerators are used, the limitation of maximum cure rate when fixed levels of phosphonium or ammonium salt accelerator are used and with fixed levels of inorganic bases such as Ca (OH)$_2$ and MgO in the presence of fixed levels of aromatic di- or polyhydroxy compounds such as 4,4'-hexafluoroisopropylidene bisphenol (Bisphenol AF) or hydroquinone, or the limitations of resistance to swelling by boiling water of a fast curing and highly compression set-resistant vulcanizate. The use of polyol permits the use of shorter and more economical press curing cycles than could be attained in its absence and affords vulcanizates that possess excellent physical properties.

EXAMPLE 1

A fluoroelastomer composition of the present invention is prepared, cured, and tested. The composition is prepared by blending the following on a 2-roll rubber mill whose rolls are at about 25° C.: 100 parts fluoroelastomer, 15 parts carbon black, 6 parts calcium hydroxide, 3 parts magnesium oxide, 0.90 parts benzyltriphenylphosphonium chloride, 2.0 parts 4,4'-hexafluoroisopropylidene diphenol (Bisphenol AF) and 2.0 parts Hercules ®PE-200 (a mixture that contains about 88% pentaerythritol and about 12% poly-pentaerythritols, including dipentaerythritol). The fluoroelastomer is a vinylidene fluoride/hexafluoropropylene/-tetrafluoroethylene 45:30:25 terpolymer whose Mooney Viscosity (ML-10 at 121° C.) is 75.

Test results are shown in Table 1. Samples of the freshly prepared uncured compositions are used for measuring (a) curing characteristics with the oscillating disc cure meter according to ASTM Method D-2084 and (b) Mooney Scorch according to ASTM Method D-1646-63. Under "curing characteristics" the table shows the time in minutes to reach 50% of full cure (t '50) and to reach a 0.2 N-m rise above the minimum torque (ts 0.2).

In preparing the cured samples, the pellets and slabs are press cured for 15 minutes at 177° C. at a total force of abut 4 MN per m$^2$ of mold area.

The cured samples are postcured for 24 hours at 232° C. in a circulating air oven. After postcuring the cured samples are subjected to heataging by exposure to circulating air for 7 days at 275° C. in an oven. The modulus, tensile strength and elongation values are obtained at room temperature by ASTM Method D-412. Compression set values are obtained by ASTM Method D-395-61.

The fluoroelastomer composition of Example 1 is very useful for the rapid manufacture of cured fluoroelastomer articles having excellent physical properties (as indicated in Table 1); relatively short and economical press-curing cycles can be used to manufacture such articles. The Example 1 composition can be used for the manufacture of heat and solvent resistant and resilient O-rings, seals, gaskets, tubing and the like.

TABLE 1

|  | Examples | | |
|---|---|---|---|
|  | 1 | 2 | 3 |
| Curing Characteristics at 177° C./24', ASTM D-2084 | | | |
| $M_H - M_L$, N · m | 3.9 | 3.8 | 3.9 |
| $t_s$ 0.2, min. | 1.4 | 2.9 | 1.4 |
| t' 50, min. | 2.4 | 5.3 | 2.4 |
| Mooney Scorch, 121° C. | | | |
| Minimum | 81 | 80 | 81 |
| Minutes to 5-point rise | 9.5 | >30 | 9.5 |
| Test Results Cured Samples: | | | |
| Modulus - 100%, MPa | 10.0 | 7.7 | 9.5 |
| Tensile strength, MPa | 16.4 | 16.6 | 16.6 |
| Elongation at Break, % | 160 | 185 | 155 |
| Compression set, % Pellets, 70h/204° C. | 42 | 39 | 41 |
| Cured/Heat-Aged Samples: | | | |
| Modulus - 100%, MPa | 4.7 | 3.7 | 4.6 |
| Modulus - 200%, MPa | 7.6 | 6.8 | 7.5 |
| Tensile strength, MPa | 8.3 | 8.8 | 8.3 |
| Elongation at Break, % | 260 | 300 | 265 |

EXAMPLE 2

For purposes of comparison, a fluoroelastomer composition outside the present invention is prepared, cured, and tested in the manner described in Example 1 except that the Hercules ®PE-200 used in Example 1 is omitted from the composition.

Test results are shown in Table 1, where it can be seen that 5.3 minutes are required to reach 50% of full cure, compared with 2.4 minutes in Example 1; and that the onset of cure ($t_s$ 0.2) is 2.9 minutes, compared with 1.4 minutes in Example 1. Thus a very worthwhile improvement in curing rate is obtained in Example 1.

EXAMPLE 3

Another fluoroelastomer composition of this invention is prepared, cured and tested in the manner described in Example 1 except that the 2.0 parts Hercules ®PE-200 used in Example 1 has been replaced with 2.0 parts pure pentaerythritol.

Test results are shown in Table 1, where it can be seen that the composition has a surprisingly fast cure rate and that the cured samples have very good physical properties.

EXAMPLE 4

Another fluoroelastomer composition of this invention is prepared and cure-tested in the manner described in Example 1 except that the fluoroelastomer is a vinylidene fluoride/hexafluoropropylene 60:40 dipolymer whose Mooney Viscosity (ML-10 at 100° C.) is 60 and that the levels of benzyltriphenylphosphonium chloride, calcium hydroxide, magnesium oxide, and pentaerythritol are reduced to 0.55, 2.0, 2.0, and 1.0 parts, respectively, from the levels used in Example 3.

Test results are shown in Table 2, where it can be seen that the composition has a surprisingly fast cure rate and the cured samples have very good physical properties, especially with respect to resistance to swelling by 100° C. water.

EXAMPLE 5

For purposes of comparison, a fluoroelastomer composition outside the present invention is prepared, cured, and tested in the manner described in Example 4, except that the pentaerythritol used in Example 4 is omitted.

Test results shown in Table 2, where it can be seen that 10.3 minutes are required to reach 50% of the full state of cure, compared with 4.4 minutes in Example 4, and that the resistance to swelling by 100° C. water is somewhat lower than that of the cured composition of Example 4. Thus, a very worthwhile improvement is cure rate and a somewhat better resistance to swelling by 100° C. water is obtained in Example 4.

TABLE 2

|  | Examples | | | | |
|---|---|---|---|---|---|
|  | 4 | 5 | 6 | 7 | 8 |
| Curing Characteristics at 177° C./24', ASTM D-2084 | | | | | |
| $M_H$, N · m | 6.6 | 5.9 | 6.4 | 6.7 | 2.1 |
| $M_L$, N · m | 0.5 | 0.5 | 0.6 | 0.5 | 0.4 |
| $t_s$ 0.2, min. | 3.2 | 6.9 | 3.8 | 4.4 | 11.8 |
| t' 50, min. | 4.4 | 10.3 | 5.0 | 6.0 | >24 |
| Mooney Scorch, 121° C./30' | | | | | |
| Minimum | 38 | 29 | 37 | 34 | 28 |
| Points rise in 30 min. | 0 | <1 | 0 | 0 | 0 |
| Test Results Cured Samples: | | | | | |
| Modulus - 100%, MPa | 6.8 | 4.5 | 5.9 | 5.9 | 2.0 |
| Tensile strength, MPa | 10.5 | 10.8 | 12.2 | 9.9 | 7.3 |
| Elongation at Break, % | 170 | 280 | 220 | 170 | 850 |
| Compression set, % Pellets, 70h/204° C. | 22 | 21 | 21 | 30 | — |
| Water swell, volume % 7 d/100° C. | 2.3 | 2.9 | 5.1 | 1.5 | — |

EXAMPLE 6

For purposes of comparison, a fluoroelastomer composition outside the present invention is prepared, cured, and tested in the manner described in Example 4, except that the levels of calcium hydroxide and magnesium oxide used in Example 4 are increased to 6.0 and 3.0, respectively, and that the pentaerythritol used in Example 4 is omitted.

Test results are shown in Table 2, where it can be seen that the composition has a cure rate that is somewhat slower than that of the composition of Example 4 and that the cured samples have very good physical properties, except for resistance to swelling by 100° C. water. Thus, a very worthwhile improvement in resistance to swelling by 100° C. water is obtained with the cured composition of Example 4 at a cure rate that is higher than that of the uncured composition of Example 6.

EXAMPLE 7

Another fluoroelastomer composition of this invention is prepared and cure-tested in the manner described in Example 4, except that the calcium hydroxide level used in Example 4 is reduced to 1.0 parts.

Test results are shown in Table 2, where it can be seen that the composition has a surprisingly fast cure rate and that the cured samples have very good physical properties, especially with respect to resistance to swelling by 100° C. water.

EXAMPLE 8

For purposes of comparison, a fluoroelastomer composition outside the present invention is prepared and subjected to the curing conditions as described in Example 7, except that the pentaerythritol used in Example 7 is omitted.

Results are shown in Table 2, where it can be seen that the composition of Example 8 fails to reach a reasonably high cure state in 15 minutes at curing temperature, compared with the composition of Example 7, which reaches a high cure state in less than 15 minutes, and whose cured composition has excellent resistance to swelling by 100° C. water.

EXAMPLE 9

Another fluoroelastomer composition of this invention is prepared and cure-tested in the manner described in Example 6, except that 1.87 parts dipentaerythritol, which is the monoether that results from mono-dehydration of two equivalents of pentaerythritol, is also present in the composition.

Curing characteristics and Mooney Scorch results are shown in Table 3, where it can be seen that the composition has a surprisingly high cure rate compared to the cure rate of the composition of Example 6.

TABLE 3

|  | Examples | |
|---|---|---|
|  | 9 | 10 |
| Curing Characteristics at 177° C./24', ASTM D-2084 | | |
| $M_H$, N·m | 5.8 | 5.5 |
| $M_L$, N·m | 0.5 | 0.5 |
| $t_s$ 0.2, min. | 2.5 | 2.2 |
| t' 50, min. | 3.3 | 3.1 |
| Mooney Scorch, 121° C./30' | | |
| Minimum | 33 | 32 |
| Minutes to 5-point rise | >30 | 23 |

EXAMPLE 10

Another fluoroelastomer composition of this invention is prepared and cure-tested in the manner described in Example 9, except that the 1.87 parts of dipentaerythritol used in Example 9 are replaced with 0.76 parts 2,2-dimethyl-1,3-propanediol.

Curing characteristics and Mooney Scorch results are shown in Table 3, where it can be seen that the composition has a surprisingly high cure rate compared to the cure rate of the composition of Example 6.

EXAMPLE 11

Another fluoroelastomer composition of this invention is prepared and cure-tested in the manner described in Example 3 except that (a) the 0.90 parts benzyltriphenylphosphonium chloride of Example 3 is replaced by 0.98 parts of the mono-benzyltriphenylphosphonium salt of Bisphenol AF, (b) the 2.0 parts of Bisphenol AF is reduced to 1.53 parts, (c) the 2.0 parts of pentaerythritol of Example 3 is reduced to 1.0 parts, and (d) 1.0 parts of p-chlorophenylsulfone are added.

Test results are shown in Table 4, where it is seen that the composition has a surprisingly fast cure rate and that the cured samples have very good physical properties in general and outstanding compression set resistance and scorch safety in particular.

EXAMPLE 12

For purposes of comparison, a fluoroelastomer composition outside the present invention is prepared and cure tested in the manner described in Example 11, except that the pentaerythritol used in Example 11 is omitted.

Results are shown in Table 4, where it can be seen that the composition of Example 12 has a much slower cure rate than that of the composition of Example 11. Thus, a very worthwhile improvement in cure rate is obtained with the composition of Example 11 compared with the composition of Example 12.

TABLE 4

|  | Examples | |
|---|---|---|
|  | 11 | 12 |
| Curing Characteristics at 177° C./24', ASTM D-2084 | | |
| $M_H$, N·m | 6.3 | 6.0 |
| $M_L$, N·m | 1.3 | 1.0 |
| $t_s$ 0.2, min. | 2.4 | 6.9 |
| t' 50, min. | 4.0 | 11.7 |
| Mooney Scorch, 121° C./30' | | |
| Minimum | 73 | 60 |
| Points rise in 30 minutes | 4 | 3 |
| Test Results Cured Samples: | | |
| Modulus - 100%, MPa | 7.4 | 6.9 |
| Tensile strength, MPa | 17.5 | 16.9 |
| Elongation at Break, % | 200 | 200 |
| Compression set, % Pellets, 70h/204° C. | 38 | 40 |
| Heat-Aged Samples: | | |
| Modulus - 100%, MPa | 3.1 | 2.8 |
| Modulus - 200%, MPa | 5.3 | 5.3 |
| Tensile strength, MPa | 6.9 | 7.7 |
| Elongation at Break, % | 315 | 330 |

EXAMPLE 13

Another fluoroelastomer composition of this invention is prepared and cure-tested in the manner described in Example 1, except that (a) the terpolymer fluoroelastomer used in Example 1 is replaced by a tetrapolymer of vinylidene fluoride/hexafluoropropylene/tetrafluoroethylene/3,3,4,4-tetrafluoro-4-bromobutene 35:34:29:2, whose Mooney Viscosity (ML-10 121° C.) is 60, (b) the level of benzyltriphenylphosphonium chloride used in Example 1 is increased from 0.9 parts to 1.2 parts, (c) the level of Bisphenol AF used in Example 1 is increased from 2.0 parts to 3.0 parts, and (d) the level of Hercules®PE-200 used in Example 1 is reduced from 2.0 parts to 0.5 parts.

Curing characteristics and Mooney Scorch results are shown in Table 5, where it can be seen that the composition has a surprisingly high cure rate compared to the composition of Example 14. The increased cure rate of the composition of Example 13 compared to the cure rate of the composition of Example 14 is a significant advantage in keeping the molding cycle as short as possible.

TABLE 5

|  | Examples | | | |
|---|---|---|---|---|
|  | 13 | 14 | 15 | 16 |
| Curing Characteristics at 177° C./24', ASTM D-2084 | | | | |
| $M_H$, N·m | 6.7 | 6.7 | 5.9 | 5.8 |
| $M_L$, N·m | 1.5 | 1.5 | 1.3 | 1.4 |
| $t_s$ 0.2, min. | 2.3 | 3.2 | 2.7 | 3.1 |

TABLE 5-continued

|  | Examples | | | |
|---|---|---|---|---|
|  | 13 | 14 | 15 | 16 |
| t' 50, min. | 4.0 | 5.6 | 5.5 | 7.0 |
| Mooney Scorch, 121° C./30' | | | | |
| Minimum | 85 | 80 | 64 | 67 |
| Minutes to 5-point rise | >15 | >15 | 19 | 19 |
| Test Results | | | | |
| Cured Samples: | | | | |
| Modulus - 100%, MPa | 9.9 | 9.2 | 5.2 | 4.8 |
| Modulus - 200%, MPa | — | — | 12.0 | 11.7 |
| Tensile strength, MPa | 15.8 | 15.7 | 17.3 | 16.4 |
| Elongation at Break, % | 165 | 170 | 290 | 290 |
| Compression set, % | 39 | 37 | 84 | 81 |
| Pellets, 70h/204° C. | | | | |

EXAMPLE 14

For purposes of comparison, a fluoroelastomer composition outside the present invention is prepared and cure tested in the manner described in Example 13, except that the Hercules ®PE-200 used in Example 13 is omitted.

Results are shown in Table 4, where it can be seen that the composition of Example 13 reaches 50% of its full cure state in only 4.0 minutes and the composition of Example 14 requires 5.6 minutes to reach 50% of its full cure state.

EXAMPLE 15

Another fluoroelastomer composition of this invention is prepared and cure-tested in the manner described in Example 1, except that (a) the benzyltriphenylphosphonium chloride, Bisphenol AF, and calcium hydroxide used in Example 1 are replaced by 3.0 parts N,N'-dicinnamylidene-1,6-hexanediamine, which is also known as DIAK #3, (b) the level of magnesium oxide used in Example 1 is increased from 3 parts to 15 parts, and (c) the level of Hercules ®PE-200 used in Example 1 is reduced from 2.0 parts to 1.0 parts.

Curing characteristics and Mooney Scorch results are shown in Table 5, where it can be seen that the composition has a surprisingly high cure rate compared to the cure rate of the composition of Example 16. The increased cure rate of the composition of Example 15 compared to the cure rate of the composition of Example 16 is a significant advantage.

EXAMPLE 16

For purposes of comparison, a fluoroelastomer composition outside the present invention is prepared and cure-tested in the manner described in Example 15, except that the Hercules ®PE-200 used in Example 15 is omitted.

Results are shown in Table 5, where it can be seen that the composition of Example 15 reaches 50% of its full cure state in only 5.5 minutes and the composition of Example 16 requires 7.0 minutes to reach 50% of its full cure state.

I claim:

1. A curable composition comprising:
   (A) a copolymer containing polymerized vinylidene fluoride units, and polymerized hexafluoropropylene units, or polymerized chlorotrifluoroethylene units, or polymerized 1-hydropentafluoropropylene units or polymerized 2-hydropentafluoropropylene units,
   (B) a quaternary phosphonium or quaternary ammonium vulcanization accelerator,
   (C) a crosslinking agent selected from the group consisting of dihydroxy-, trihydroxy- and tetrahydroxy- -benzenes, -naphthalenes and -anthracenes having an aromatic ring, and bisphenols of the formula

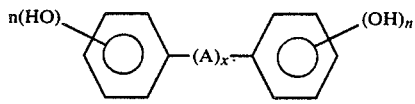

wherein A is a difunctional radical, x is 0 or 1 and n is 1 or 2,
   (D) a polyol coaccelerator selected from the class consisting of pentaerythritol, 2,2-dimethyl-1,3-propanediol, dipentaerythritol, and trimethylol propane.
   (E) a metal compound selected from the group consisting of divalent metal oxide, divalent metal hydroxide and mixtures of such oxides and hydroxides with metal salts of weak acids.
   said composition containing for each 100 parts by weight of component A, about 0.2 to 2 parts by weight of component (B), about 0.5 to 4 parts of component (C), about 0.05 to 4 parts of component (D), and 0.5 to 30 parts of component (E).

2. The composition of claim 1 in which the polyol is pentaerythritol.

3. The composition of claim 1 in which the polyol is 2,2-dimethyl-1,3-propanediol.

4. The composition of claim 1 in which the polyol is dipentaerythritol.

5. The composition of claim 2 in which the divalent metal oxide is calcium hydroxide.

6. The process of forming a fluoroelastomer which comprises heating the composition of claim 1 in a confining zone.

* * * * *